United States Patent [19]

Miller

[11] Patent Number: 4,615,903
[45] Date of Patent: Oct. 7, 1986

[54] METHOD FOR MELT-COATING A SURFACE

[75] Inventor: Douglas L. Miller, Fredericksburg, Va.

[73] Assignee: The United States of America as represented by the Secretary of the Navy, Washington, D.C.

[21] Appl. No.: 750,218

[22] Filed: Jul. 1, 1985

[51] Int. Cl.⁴ .............................................. B05D 1/04
[52] U.S. Cl. ......................................... 427/26; 427/27;
427/53.1; 427/189; 427/191; 427/195; 427/198
[58] Field of Search .................. 427/26, 27, 53.1, 189,
427/191, 195, 198

[56] References Cited

U.S. PATENT DOCUMENTS

| | | | |
|---|---|---|---|
| 2,173,484 | 9/1939 | Lerch et al. | 427/190 |
| 2,462,487 | 2/1949 | Griffith et al. | 19/144 |
| 2,896,263 | 7/1959 | Frederick et al. | 18/48 |
| 3,085,025 | 4/1963 | Eaton | 427/198 |
| 3,451,884 | 6/1969 | Anno et al. | 428/96 |
| 3,598,566 | 8/1971 | Inoue | 75/5 |
| 3,951,063 | 4/1976 | Schank | 427/98 |
| 4,200,669 | 4/1980 | Schaefer | 427/53.1 |
| 4,300,474 | 11/1981 | Livsey | 427/53.1 |

FOREIGN PATENT DOCUMENTS

| | | | |
|---|---|---|---|
| 4531044 | 3/1967 | Japan . | |
| 53-147534 | 12/1978 | Japan | 427/53.1 |

OTHER PUBLICATIONS

Bright et al, Electrostatic Powder Coating in Industry—A Survey of Recent Advances and Future Developments.

*Primary Examiner*—Richard Bueker
*Attorney, Agent, or Firm*—R. F. Beers; T. E. McDonnell

[57] ABSTRACT

A method for coating a surface comprises providing an electrostatically charged powder, irradiating the powder with energy until the powder or the surface melts, and allowing the surface to solidify.

20 Claims, 4 Drawing Figures

METHOD FOR MELT-COATING A SURFACE

BACKGROUND OF THE INVENTION

The invention pertains generally to coating a surface and more particularly to melt-coating a surface with a staticly charged powder.

Melt-coating pertains to coating a surface by either melting a powder in contact with the surface or by melting the surface and embedding a powder, e.g., refractory ceramic powder in the molten surface to form a composite surface. In both cases, energy, e.g., a laser beam, radiant heat, electron beam or proton beam is directed on a powder and surface to cause one or both to melt. Several general problems exist with this technique.

One problem is a large reflection by some of the powders, e.g., tantalum carbide, causing much wasted energy and longer processing times. Large reflections make additional requirements on the equipment to shield the reflected energy.

Another problem is degradation of the surface before the powder has been adequately heated. Even if the surface is being melted, this problem exists because the composite layer often has improved properties if the powder has a high temperature at the time the molten surface solidifies. Consequently, a choice has to be made between either inadequately heating the powder or tolerating degradation of the surface. Of course, many melt-coating applications are not possible or practical on account of this problem.

A coating is often needed only on a certain portion of a surface, requiring the non-coated portions to be shielded or masked. These techniques increase the cost and complexity of processing and the chance for contamination of the coating.

Presently, static-charging a powder is being used to facilitate the movement of large quantities of powder which tend to agglomerate. An example of this application is given in U.S. Pat. No. 2,462,487 by Griffith et al. An opposite application of static charging a powder is given in U.S Pat. No. 2,896,263 by Frederick et al., wherein the bulk density of a powder is reduced and agglomeration is increased by subjecting the powder to an electrostatic charge that is opposite to the natural electrostatic charge. In U.S. Pat. No. 3,598,566 by Yoshi Inoue, static charging is used to improve purity and to clean the surface of the powder by removing oxides, moisture and other impurities. Static charging is used to improve the sintering of powder in Japanese Pat. No. 45-31044. The probable mechanism for the improved sintering is the removal of oxides and other impurities.

SUMMARY OF THE INVENTION

It is, therefore, an object of this invention to increase the energy absorption of a layer of powder on a surface and thereby decrease the amount of energy needed to melt the layer of powder on the surface.

Another object of this invention is to increase the thermal insulation of a layer of powder on a surface, thereby protecting said surface.

A further object of this invention is to control the location of a layer of powder on a surface without physical contact.

These and other objects are achieved by utilizing a staticly charged powder in melt-coating a surface.

DETAILED DESCRIPTION OF THE INVENTION

Figure 1A:
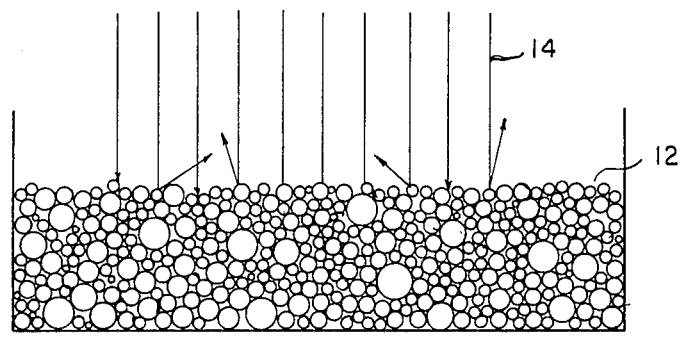
FIG. 1a illustrates the packing of powder with no or insufficient electrostatic charge.
Figure 1B:
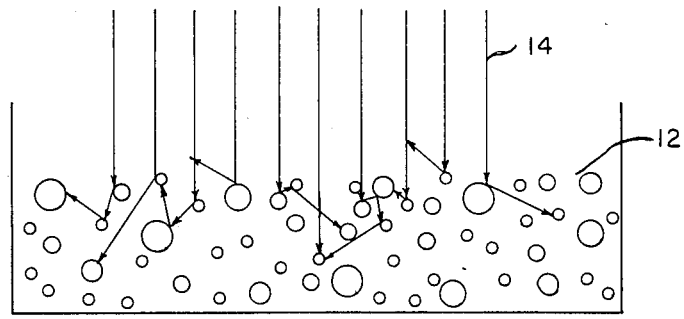
FIG. 1b illustrates the packing of powder with a sufficient electrostatic charge.

Electrostatically charging a powder causes a charge to be placed on the surface of each particle. It is sometimes referred to as ionizing the powder. If sufficient charge is placed on the powder, the effect is to decrease the bulk density of the powder by increasing the separation between some or all the particles. It is the increased separation that improves the absorption of energy by a powder. FIGS. 1a and 1b illustrate this principle. If the powder 12 is tightly packed, as in FIG. 1a, energy 14 can only be absorbed or reflected away from the powder. However, if the powder 12 is not tightly packed, as in FIG. 1b, a portion of the energy 14 penetrates the general mass of the powder before it contacts a particle. The amount of reflection from an individual particle is the same, but in the case of FIG. 1b, the energy is more likely to be reflected to another particle. The likelihood of a reflection to another particle is a function of the roundness of the surface of the particles and the amount of spacing between the particles.

Regardless of the shape of the particle surface and the amount of separation, heat absorption is improved with any amount of separation. The threshhold amount of static charge depends on the reflectivity of the powder and the weight of the particles. If the powder is very reflective, e.g., tantalum carbide (TaC) with laser light, a greater separation would be needed before an improved melt of the powder can be achieved. A heavy particle would need more charge to overcome the force of gravity than would a light particle.

The type of charge, i.e., positive or negative, does not matter; so long as sufficient charge is placed on the particle. Also, it is not necessary that the bulk density is constant throughout the layer of powder. In fact, thick layers would have a higher density at the bottom than at the top. Since the reduction in reflection occurs through the interreaction of the top few particles with the impinging energy, the higher density at the bottom of the layer would have little effect. If the surface is electrostatically charged with the same charge as the powder, the bulk density would be lower near the surface to be coated, higher in the middle, and lower at the top of the layer of powder.

The practice of this invention is not restricted to any method of electrostatically charging the powder. For example, the powder can be charged by repeated or prolonged sliding contact with a dielectric material, exposure to an ionizing atmosphere, or exposure to a power source or a Vander Graff generator. Any of the methods disclosed in the previously cited prior art can be utilized and accordingly they are incorporated herein by reference.

Similarly, the practice of this invention is not restricted to any particular method of melting. For example, laser light, electron beam, proton beam or induction heating by a tungsten filament can be used. The benefit of this invention is best realized with a method utilizing a form of energy that is reflected to a large extent by the powder.

The technique of this invention can be used with any material. Exemplary of the more important uses of this invention would be for coating cobalt, nickel, tantalum, titanium and alloys thereof and refractory ceramics on steel, aluminum or alloys of magnesium. The present technique would also be useful in coating thin films.

It has been determined that the static charge does not leak off at a rate that would eliminate the static charge before melting, thereby eliminating any benefits from the charged particles. The powder holds its charge many times longer than is necessary since the powder generally does not remain in contact with the surface for more than a few minutes. It is also possible to ionize the powder while it is on the surface by, e.g., impinging the powder with a stream of ions.

Protection of the surface arises from the thermal insulative capacity of air or other gases. A comparison of FIGS. 1a and 1b shows the increased amount of air or gas in the bulk volume of the powder. Additional protection arises from the faster absorption of energy by the powder, thus reducing the heating time and the amount of energy being conducted into the surface.

Figure 2A:
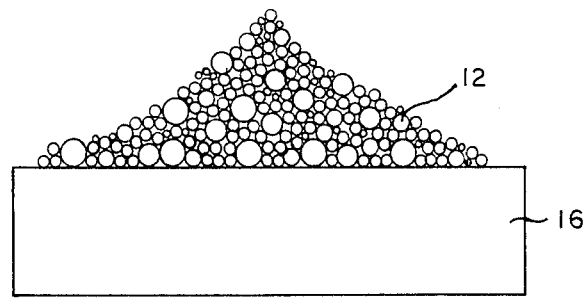
FIG. 2a illustrates the arrangement of a layer of non-charged powder.
Figure 2B:
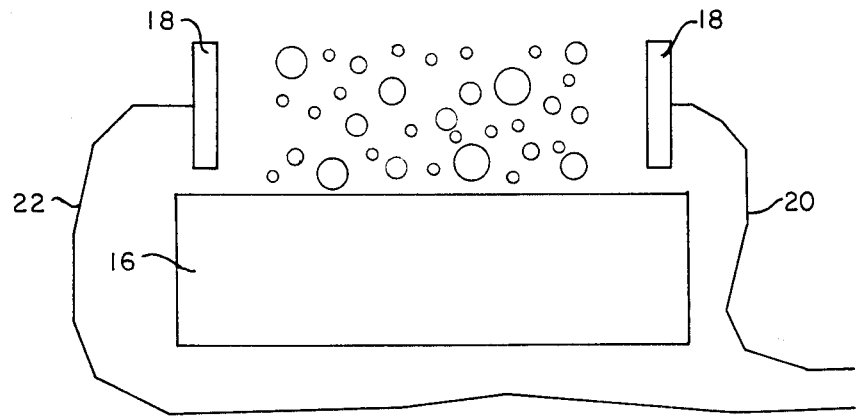
FIG. 2b illustrates the arrangement of a layer of electrostatically charged powder that is in close proximity to two plates having the same charge as the powder.

The static charge on the powder particles can be utilized to restrict the powder to a certain region on the surface. FIG. 2a and 2b illustrate this capability. In FIG. 1a, uncharged powder 12 covers most of the surface of work piece 16. Plates 18 having the same charge as the powder particles 12 repel the powder, forcing the powder into the mid region between the two plates. Again, any technique can be used to place the charge on the plates. Leads 20 and 22 are attached to one side of a solid state power source (not shown) that is remotely grounded.

Having described the invention in detail, the following examples are given by way of illustration. It is understood that these examples are given by way of illustration and are not meant to limit this disclosure or claims to follow in any manner.

EXAMPLE 1

Tantalum Carbide on Mild Steel—No Static Charge

A layer of about 1 to 2 millimeters of tantalum carbide powder was placed on mild steel in a square of about two centimeters by two centimeters. A c.w. carbon dioxide laser that operates at 4.8 kw irradiated the powder about 30 seconds after it was placed on the square. An irradiation time of about one second was necessary to complete the coating process. Shields were placed around the operation to protect the observers from reflected laser light. The shields became noticeably hot from the reflected light.

EXAMPLE 2

Tantalum Carbide on Mild Steel—Slight Static Charge

Tantalum carbide was gently agitated before being placed on the steel in the manner of Example 1. The procedure of Example 1 was repeated with the same result, i.e., much reflected heat and an irradiation time of about one second.

EXAMPLE 3

Tantalum Carbide on Mild Steel—Static Charge

Tantalum carbide was vigorously agitated for five minutes before being placed on the steel in the manner of Example 1. The procedure of Example 1 was repeated, but the coating only took about one thousandth ($10^{-3}$) of a second with no noticeable reflection of laser light.

EXAMPLE 4

Steel Powder with Electrostatic Charge

Steel powder (200 gm) in a glass container was placed on a Vander Graff generator for about 30 Seconds. The powder as then placed on a steel plate. After thirty minutes, the powder arked to a conductor which brought to within one centimeter of the powder.

The examples 1-3 demonstrate that an electrostatic charge substantially reduces the irradiation time for melt coating highly reflective tantalum carbide on mild steel. Examples 3 and 4 demonstrate that an electrostaticly charged powder can keep its charge for an appreciable amount of time. Electrostatically charging a powder provides a simple, inexpensive and effective technique to improve melt-coating processes.

Obviously, many modifications and variations of the present invention are possible in light of the above teachings. It is therefore to be understood that, within the scope of the appended claims, the invention may be practiced otherwise than as specifically described.

What is claimed is:

1. A method of melt-coating a surface which comprises:
   providing a powder for forming said coating;
   electrostatic-charging said powder, said charge being sufficient to provide separation between particles of said powder;
   placing said electrostatically charged powder on said surface;
   irradiating said powder with energy until said powder melts and
   cooling said melted powder below the melting point thereof, thereby coating said surface.

2. The method of claim 1 wherein said powder is irradiated by a laser.

3. The method of claim 1 wherein said powder is irradiated by heat from a heat source.

4. The method of claim 1 which further comprises electrostatic-charging said surface, thereby providing separation between said static-charged powder and said surface.

5. The method of claim 4 wherein at least one electrostatically charged field is placed across said surface, thereby containing said powder to a certain region on said surface.

6. The method of claim 4 wherein said powder is selected from the group consisting of cobalt, nickel, titanium, tantalum and alloys and mixtures thereof and said powder is irradiated with a laser.

7. The method of claim 5 wherein said powder is selected from the group consisting of cobalt, nickel, titanium, tantalum, and alloys and mixtures thereof and said powder is irradiated with a laser.

8. A method of melt-coating a surface which comprises:
   placing a powder for forming said coating on said surface;

electrostatically charging said powder, said charge being sufficient to provide separation between particles of said powder;

irradiating said powder with energy until said powder melts; and cooling said melted powder below the melting point, thereby coating said surface.

9. The method of claim 8 wherein said powder is irradiated by a laser.

10. The method of claim 8 which further comprises electrostatic-charging said surface, thereby providing separation between said powder and said surface.

11. A method of melt-coating a surface which comprises:

providing an electrostaticly charged powder on said surface;

irradiating said powder on said surface with energy until said surface melts, thereby causing said powder to embed into said surface; and cooling said surface below the melting point thereof.

12. A method of melt-coating a metallic surface of steel, aluminum, or a magnesium alloy which comprises:

providing an electrostatically charged powder on said surface;

irradiating said powder on said surface with energy until said surface melts, thereby causing said powder to embed into said surface; and cooling said surface below the melting point thereof.

13. The method of claim 12 wherein said powder is irradiated by a laser.

14. The method of claim 13 which further comprises the step of electrostatically charging said surface, thereby providing separation between said electrostatically charged powder and said surface.

15. The method of claim 14 wherein said powder is selected from the group consisting of a refractory ceramic, cobalt, nickel, titanium, tantalum, alloys of cobalt, nickel, titanium, and tantalum and mixtures thereof.

16. The method of claim 13 wherein said powder is selected from the group consisting of a refractory ceramic, cobalt, nickel, titanium, tantalum, alloys of cobalt, nickel, titanium, and tantalum and mixtures thereof.

17. The method of claim 12 which further comprises the step of electrostatically charging said surface, thereby providing separation between said electrostatically charged powder and said surface.

18. The method of claim 17 wherein said powder is selected from the group consisting of a refractory ceramic, cobalt, nickel, titanium, tantalum, alloys of cobalt, nickel, titanium, and tantalum and mixtures thereof.

19. A method of melt-coating a metallic surface of steel, aluminum or a magnesium alloy which comprises:

providing an electrostatically charged powder on said surface;

irradiating said powder with energy until said powder melts;

cooling said melted powder below the melting point thereof, thereby coating said surface.

20. The method of claim 19 wherein said powder is irradiated by a laser and is selected from the group consisting of cobalt, nickel, titanium, tantalum, alloys and mixtures thereof.

* * * * *